United States Patent
Cyzycki et al.

(12) 
(10) Patent No.: US 6,402,673 B1
(45) Date of Patent: Jun. 11, 2002

(54) ROLLER CONSISTING OF A METAL CORE AND A SOFT ELASTOMERIC COATING

(75) Inventors: Stanislaus Cyzycki, Leverkusen; Günter Pickelmann, Moenchengladbach, both of (DE)

(73) Assignee: Felix Böttcher GmbH & Co., Köln (DE)

(*) Notice: Subject to any disclaimer, the term of this patent is extended or adjusted under 35 U.S.C. 154(b) by 21 days.

(21) Appl. No.: 09/614,181

(22) Filed: Jul. 11, 2000

(30) Foreign Application Priority Data

Jul. 22, 1999 (DE) .......................... 199 34 569

(51) Int. Cl.⁷ ............................................ B23D 15/00
(52) U.S. Cl. ...................................................... 492/47
(58) Field of Search ............................. 492/56, 27, 53, 492/49

(56) References Cited

U.S. PATENT DOCUMENTS

| | | | | |
|---|---|---|---|---|
| 4,148,576 A | * | 4/1979 | Martino | ...................... 118/419 |
| 4,166,689 A | * | 9/1979 | Schausberger et al. | ..... 118/405 |
| 4,594,068 A | * | 6/1986 | Bardutzky et al. | .......... 219/216 |
| 5,662,574 A | * | 9/1997 | Slotten | ........................ 100/168 |
| 5,960,226 A | * | 9/1999 | Van Schepdael et al. | ..... 355/27 |
| 5,993,366 A | * | 11/1999 | Kaji et al. | .................. 428/36.9 |
| 6,059,095 A | * | 5/2000 | Tsuji | |

FOREIGN PATENT DOCUMENTS

| | | |
|---|---|---|
| DE | 27 00 118 | 7/1977 |
| EP | 0 527 293 | 2/1993 |
| EP | 0 732 201 | 9/1996 |
| EP | 0 736 382 | 10/1996 |

\* cited by examiner

Primary Examiner—I Cuda Rosenbaum
(74) Attorney, Agent, or Firm—Jacobson Holman, PLLC

(57) ABSTRACT

A roller consisting of a metal core (1) and a soft elastomeric coating (2) and two rigid necks (3, 3') has between said metal core (1) and said elastomeric coating (2) a rigid conical layer (4) of a rigid elastomer permanently bound to the metal core, and a rigid, conical, slightly expandable support (5) which is permanently bound to the soft elastomeric layer (2), wherein a space allowing a lateral displacement of the support on the rigid elastomeric layer (4) can be generated between the rigid elastomeric layer (4) and the support (5) by compressed air flowing through. During the blowing through of air, an air cushion forms which allows to laterally displace and position the sleeve on the metal core. After the blowing of the air is stopped, the sleeve contracts and tightly embraces the conical rigid elastomeric layer (4).

3 Claims, 1 Drawing Sheet

ROLLER CONSISTING OF A METAL CORE AND A SOFT ELASTOMERIC COATING

Figure 1:
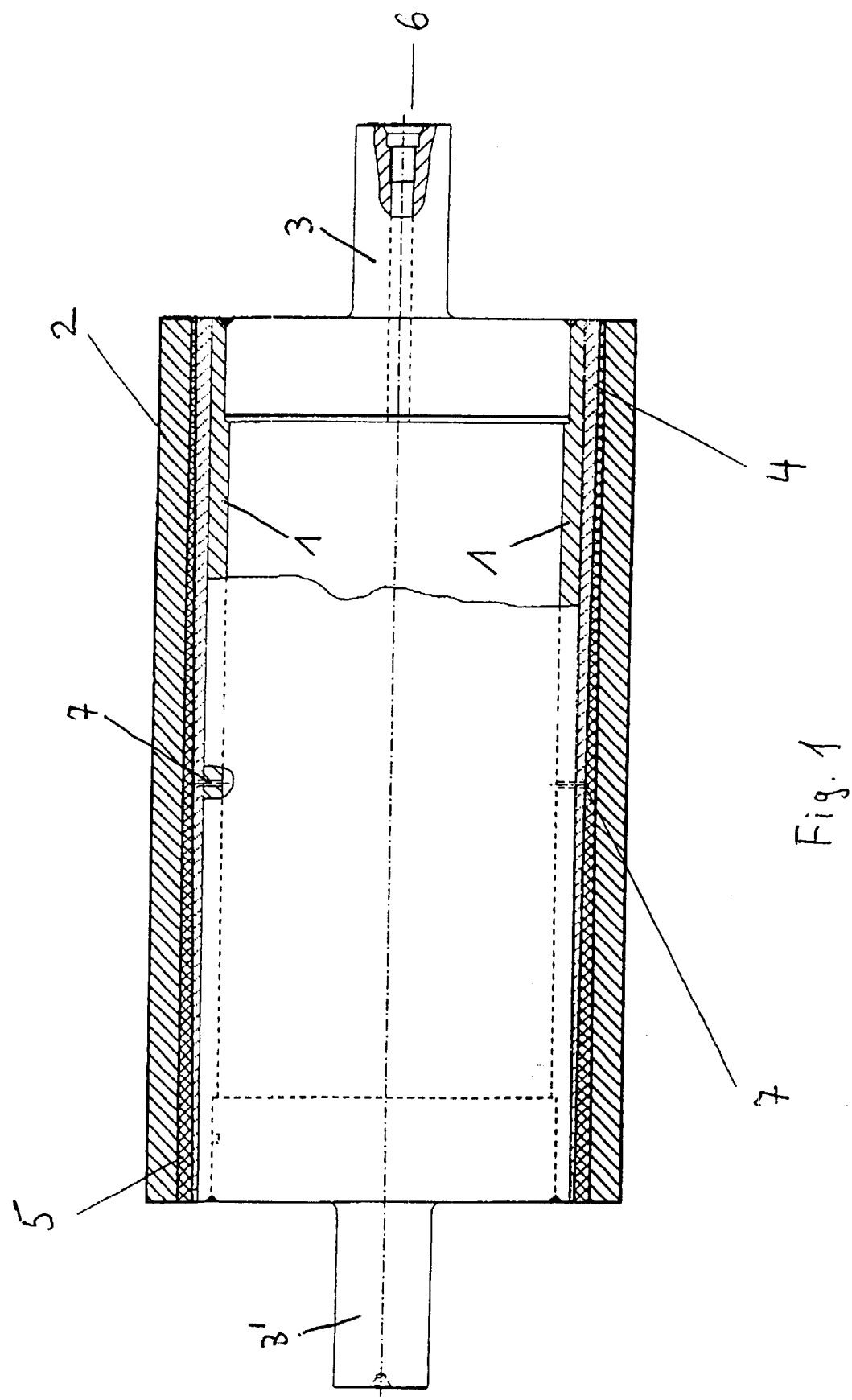

The present invention relates to a roller consisting of a metal core and a soft elastomeric coating and two rigid necks, and to a method for applying a soft elastomeric coating to a roller consisting of a metal core, two rigid necks and a soft elastomeric coating.

Rollers consisting of a metal core and a soft elastomeric coating and two rigid necks have been extensively used for the coating of smooth sheet materials, such as metal sheets, wooden boards and plastic plates. Such coating is generally effected with a very low pressure. It is necessary that the soft elastomeric coating be completely smooth and have no damages since otherwise a coating defect will be produced after each revolution of the roller. Therefore, such coating rollers are relatively often dismantled and newly ground to produce a surface which is again unobjectionably smooth. After having ground the surface repeatedly, the elastomeric coating has become so thin that it has to be completely removed and replaced by a new coating. Typical soft elastomeric coatings of such coating rollers have an initial thickness of from 20 to 30 mm. As soon as their thickness has become from 5 to 7 mm from repeated grinding, the elastomeric coating is completely removed and replaced by a new and thicker coating of from 20 to 30 mm. This renewal of the elastomeric coating requires shipment to the roller manufacturer and another shipment back of the newly coated roller.

During such shipping, it is absolutely required to take care that no damages to the roller surface occur.

For printing cylinders, especially printing cylinders for flexographic printing, it is known to place the elastomeric printing layer in the form of a non-expandable coating onto a roller mandrel which has a shrinkable design and can be enlarged after the printing sleeve has been placed onto it so that the roller core and sleeve are rigidly connected. Such printing rollers consisting of a special roller core and an slip-on sleeve are described, for example, in EP 0 527 293, EP 0 732 201 and EP 0 736 382. Thus, such printing cylinders have a complicated design and are relatively delicate.

It has been the object of the invention to simplify the process of applying a soft elastomeric coating to a roller and, in particular, to avoid the shipment of the repeatedly used and ground rollers to the manufacturer. If possible, the existing roller cores with a relatively simple design are to be reusable or recyclable.

This object is achieved by rollers having between the metal core and the elastomeric coating a rigid conical layer of a rigid elastomer permanently bound to the metal core, and a rigid, conical, slightly expandable support which is permanently bound to the soft elastomeric layer, wherein a space allowing a lateral displacement of the support on the rigid elastomeric layer can be generated between the rigid elastomeric layer and the support by compressed air flowing through.

Preferably, the metal core is hollow and has an inlet for compressed air on one side thereof. The metal core has at least one outlet for compressed air on its peripheral surface including the rigid elastomeric layer rigidly bound thereto. Generally, compressed air is blown from one side through a hole in the interior of either of the necks and can exit through several outlets. This compressed air causes a slight expansion of the exterior sleeve which can thus be easily displaced. As soon as the blowing of compressed air is stopped, the sleeve contracts and thus tightly embraces the conical rigid elastomeric layer.

As the rollers according to the invention are mainly employed for coating and therefore operate at a relatively low pressure, there is virtually no risk that the sleeve might be displaced on the metal core with the rigid elastomeric layer. However, the adhesion may optionally be increased by roughening the surface of the rigid elastomeric layer. Optionally, the rigid elastomeric layer may also contain a filler which increases the roughness so that the sleeve enclosing it can hardly slip any longer.

The soft elastomeric coating of the sleeve can be ground from time to time in the known manner to generate a surface which is again absolutely unobjectionable. As soon as the soft elastomeric coating has become too thin, the sleeve can be detached from the roller core by again blowing compressed air into it from one side. If desired, the ground and used sleeve can be sent in and recoated with soft elastomeric material. At any rate, shipment of the entire roller with the metal core is no longer required.

As the rigid, conical, slightly expandable support for the soft elastomeric layer, fiber-reinforced plastics are useful, for example. Useful fibers include, in particular, glass fibers or carbon fibers since the soft elastomeric coating can be vulcanized thereon.

Due to the conical design of this support, on the one hand, and of the rigid elastomeric layer, on the other hand, a releasable intermediate layer which has again a practical cylindrical shape as a whole Is formed between the metal core and the soft elastomeric coating. Nevertheless, the conical design facilitates the mounting of the sleeve onto the coated metal core. Such mounting is enabled by the air cushion formed during the blowing through of compressed air. After the blowing of the air is stopped, the sleeve recontracts and thus obtains a sufficiently rigid bonding to the metal core. Thus, the roller core with the conical rigid elastomeric layer stays with the user. What is exchanged and optionally regenerated is only the sleeve fitting to the metal core and consisting of the rigid, conical, slightly expandable support and the soft elastomeric layer provided thereon.

The user or the proprietor of a plant needs no longer acquire and store spare rollers. He only needs a sufficient number of sleeves.

Thus, the method for applying a soft elastomeric coating to a roller consisting of a metal core, two rigid necks and a soft elastomeric coating comprises blowing compressed air into the metal core from one side, the air leaving again through at least one outlet on the peripheral surface of the a metal core, wherein the metal core has on the peripheral surface thereof a conical rigid elastomeric layer which also has at least one outlet for the compressed air at the same positions as for the metal core, wherein a sleeve fitting to the metal core is slipped on from the opposite side while the air is blown through the metal core and the outlet(s), said sleeve consisting of a rigid, conical, slightly expandable support and said soft elastomeric layer, wherein the sleeve contracts after the blowing through of the air is stopped and tightly embraces the conical rigid elastomeric layer.

Rollers according to the invention are generally from 50 to 300 cm long and have diameters of between 15 and 35 cm. For both the support and the rigid elastomeric layer, it is sufficient for the conicity to be from 0.05 to 0.3 mm per meter of length. Generally, a conicity of 0.2 mm per meter of length of the roller will be sufficient. A substantially lower conicity makes the slipping on more difficult, while a substantially higher conicity can cause the sleeve to slip off the core under a pressure load.

As said compressed air, compressed air of about 6 bar which is usually available can be employed. At any rate, it is absolutely sufficient for generating the air cushion between the two conical layers which is necessary for mounting.

A typical embodiment of the roller according to the invention is represented in FIG. 1 wherein the reference numerals have the following meanings:

1 metal core
2 soft elastomeric coating
3, 3' rigid necks
4 rigid conical layer of a rigid elastomer which is permanently bound to the metal core
5 rigid, conical, slightly expandable support
6 inlet for compressed air
7 outlet for compressed air As soon as compressed air is blown through the inlet for compressed air, which may also be on the side at the end of the roller, if desired, the air exits through the outlet(s) 7 and generates an air cushion between the rigid elastomeric layer and the support so that the sleeve consisting of the support and the soft elastomeric layer can easily be laterally displaced. Of course, if desired, additional outlets for compressed air may also be present so that as uniform as possible an air cushion can form.

What is claimed is:

1. A roller consisting of a metal core (1) and a soft elastomeric coating (2) and two rigid necks (3, 3'), characterized in that said roller has between said metal core and said elastomeric coating (2) a rigid conical layer (4) of a rigid elastomer permanently bound to the metal core, and a rigid, conical, slightly expandable support (5) which is permanently bound to the soft elastomeric layer (2), wherein a space allowing a lateral displacement of the support on the rigid elastomeric layer can be generated between the rigid elastomeric layer (4) and the support (5) by compressed air flowing through.

2. The roller according to claim 1, characterized in that said metal core (1) is hollow and has an inlet for compressed air (6) on one side thereof, and the metal core (1) has at least one outlet for compressed air (7) on its peripheral surface including the rigid elastomeric layer (4) rigidly bound thereto.

3. The roller according to claim 1, characterized in that said inlet for compressed air is in the interior of either of the necks.

* * * * *